United States Patent [19]

Fournier et al.

[11] 4,126,890
[45] Nov. 21, 1978

[54] LASING DEVICE AND METHOD USING MERCURY AND CADMIUM OR AMMONIA

[76] Inventors: Georges Fournier, 2019 Brulart, Sillery 6, Quebec, Canada; Malcolm McGeoch, Flat A, 1 Cranley Gardens, London N10, England

[21] Appl. No.: 760,617

[22] Filed: Jan. 19, 1977

[30] Foreign Application Priority Data

Jan. 19, 1976 [CA] Canada ................................ 243765

[51] Int. Cl.$^2$ ............................................. H01S 3/22
[52] U.S. Cl. ................................. 331/94.5 G; 330/4.3
[58] Field of Search .................... 331/94.5 G; 330/4.3

[56] References Cited

PUBLICATIONS

Fournier et al., *Optical Communications*, vol. 18, No. 1, p. 121, Jul., 1976.
McGeoch et al., *Journal of Physics B: Atomic and Molecular Physics*, vol. 9, No. 5, Apr. 1, 1976, Great Britain, pp. L121–L125.
Sabotinoy et al., *IEEE Journal of Quantum Electronics*, Aug., 1973, vol. QE-9, No. 8, pp. 857–859.
Kano et al., *Journal of the Physical Society of Japan*, vol. 38, No. 2, p. 596, Feb., 1975.

*Primary Examiner*—William L. Sikes
*Assistant Examiner*—Marcus S. Rasco
*Attorney, Agent, or Firm*—Beveridge, De Grandi, Kline & Lunsford

[57] ABSTRACT

Light amplification for use in an optical amplifier or optical resonator can be obtained by exciting cadmium-mercury molecular dimer with an electron beam sustained discharge. Light amplification can also be obtained by exciting a mercury-ammonia complex with an electron beam sustained discharge or with mercury radiation at 2,537 Angstroms produced in an electron beam sustained discharge.

30 Claims, 5 Drawing Figures

LASING DEVICE AND METHOD USING MERCURY AND CADMIUM OR AMMONIA

This invention relates to optical amplifiers or optical resonators of the laser type. More particularly, this invention relates to an optical amplifier or resonator using a cadmium-mercury dimer as the agent which gives light amplification.

The present inventors have discovered that efficient lasing radiation is achieved by the use of a mixture of mercury and cadmium vapour, which can be excited by suitable means, such as an electron beam controlled discharge. It is believed that the main species emitting lasing radiation is a memory-cadmium dimer.

According to the invention, a mixture of vapours of mercury and cadmium is excited by electrons present in an electron beam sustained discharge in the mixture. Optionally, the mixture can contain a noble gas such as argon or krypton. The number density of the mixture (i.e., number of atoms per cubic centimeter) should not exceed $10^{21}$ and preferably should be less than $5 \times 10^{19}$. The number density of cadmium atoms in the vapour should be at least $5 \times 10^{16}$, preferably at least $5 \times 10^{17}$. The number density of cadmium atoms in the vapour should not exceed $2 \times 10^{19}$ with a preferred upper limit of $10^{19}$. Operation beyond these ranges leads to considerably decreased efficiency.

The ratio of number density of mercury atoms to number density of cadmium atoms can range from 2:1 to 100:1. It is preferred that the number density of mercury atoms be from about 3 to 30 times as large as the number density of cadmium atoms.

The purpose of the noble gas which can optionally be present is primarily to conduct away and dissipate excess heat, and to moderate the discharge by helping to reduce the ionization coefficient per neutral atoms such that a stable electron beam sustained glow discharged is achieved. It is also thought that noble gases assist to some extent in the formation of excited cadmium-mercury dimer molecules, by the mechanism known as "three body formation". Other materials which are substantially inert under the conditions giving rise to mercury-cadmium laser activity could also be used as heat removers, and such materials will be evident to one skilled in the art. In this disclosure, the term "noble gas" includes helium, neon, argon, krypton and xenon, but does not include radon. The preferred noble gas is argon. Generally argon in a number density ranging from zero to 1,000 times the number density of cadmium atoms is useable. For most applications, number densities in the range from 10 to 100 times the number density of the cadmium atoms will be satisfactory. In all the aforementioned cases in order to obtain efficient excitation of the mercury-cadmium dimer it is preferred to maintain the following relation:

$$[N_{Hg} \times (N_{Hg} + N_G)] > 2 \times 10^{36}$$

where $N_{Hg}$ is the number density of mercury atoms, and $N_G$ is the number of noble gas atoms.

In order to create a sufficient population of excited cadmium-mercury dimer for lasing, an electron density of about $10^{14}$ to $10^{15}$ electrons/cm$^3$ should be maintained in the discharge chamber. Electron densities at the high end of this range should be used in cases where one wishes to excite the mercury-cadmium on a fast time scale. The time required for excitation of a given mixture becomes shorter as the electron density is increased over the range quoted above. Typically, electron densities of $10^{14}$/cm$^3$ are suitable for excitation times of a few microseconds. The required electron density can be obtained by passing an electron beam into the discharge chamber. The voltage of the electron beam will of course depend upon the thickness and nature of the material which the beam must pass through, as well as the number densities of the gases in the discharge volume, how fast a discharge is sought, and over what depth the discharge is sought. Having regard to these requirements, a person skilled in the art can easily calculate the desired electron beam voltage for any particular configurations. Typical installations will use electron beam voltages from below 100,000 electron-volts to several million electron-volts. The electron beam current density can then be calculated, once the electron beam voltage is determined, in order to maintain the desired electron density over the desired time. The current density will also vary with the electronic recombination coefficient of the particular mixture of gases used. A suitable electron beam current density can easily be calculated by a person skilled in the art. Suitable current densities, having regard to factors discussed above, will vary in different gas mixtures from .1 ampere to 1,000 amperes per square centimeter. Under most conditions, suitable current levels will range from 0.1 ampere to 10.0 amperes per square centimeter.

The useful range of electric field to total mixture number density (hereinafter called the E/N value) should be kept between $10^{-17}$ volts-cm$^2$ and $2 \times 10^{-16}$ volts-cm$^2$, with a preferred range being $2 \times 10^{-17}$ to $10^{-16}$ volts-cm$^2$. This range can be attained by adjusting the voltage across the discharge chamber.

When the ratio of mercury to cadmium is within the lower part of the range of ratios specified earlier, it is preferred that the E/N ratio be toward the higher end of the E/N range specified, whereas when the ratio of mercury to cadmium is toward the higher part of the given range, the optimum E/N ratio is found to be smaller. Generally, the efficiency is better with small E/N ratios, but this effect is often offset by the fact that more power is delivered per cubic centimeter of the discharge chamber at higher E/N ratios.

Optical absorbtion in the range of wave lengths emitted by the mercury-cadmium dimer is minimized at low temperature, so care should be taken to keep the temperature as low as possible, commensurate with the desired number densities of cadmium and mercury atoms in the vapour state. In order to achieve the desired ratios and absolute number densities of mercury and cadmium atoms, it may in some cases be desirable to seal the vessel in which lasing action occurs, insuring that only the required quantities of substances are present therein, so that when these quantities are fully vaporized, the desired mix is obtained. Optionally, this mixture may then be slightly overheated in order to ensure that no deposits or at least only very minor deposits of conducting material occur on the walls of the vessel. This conduction could in certain cases lead to surface tracking and or shorting between the electrodes. The desirability of keeping the temperature as low as possible should be understood in the context of permitting the use of a slighly higher temperature than would otherwise be chosen, in a case where surface tracking is thought to be a potential problem.

For typical arrangements temperatures in the range of 700° K. to 1,000° K. have been found to be suitable. The mercury-cadmium dimer emits in a band which peaks around 4,700 Angstroms whose full width at halph maximum is about 800 Angstroms. Light amplification occurs and is usable in a region within that band. The peak gain cross section is of the order of $10^{-19}$ cm$^2$.

The invention will be further explained with reference to the drawings, in which.

EXAMPLE 1

Figure 1:
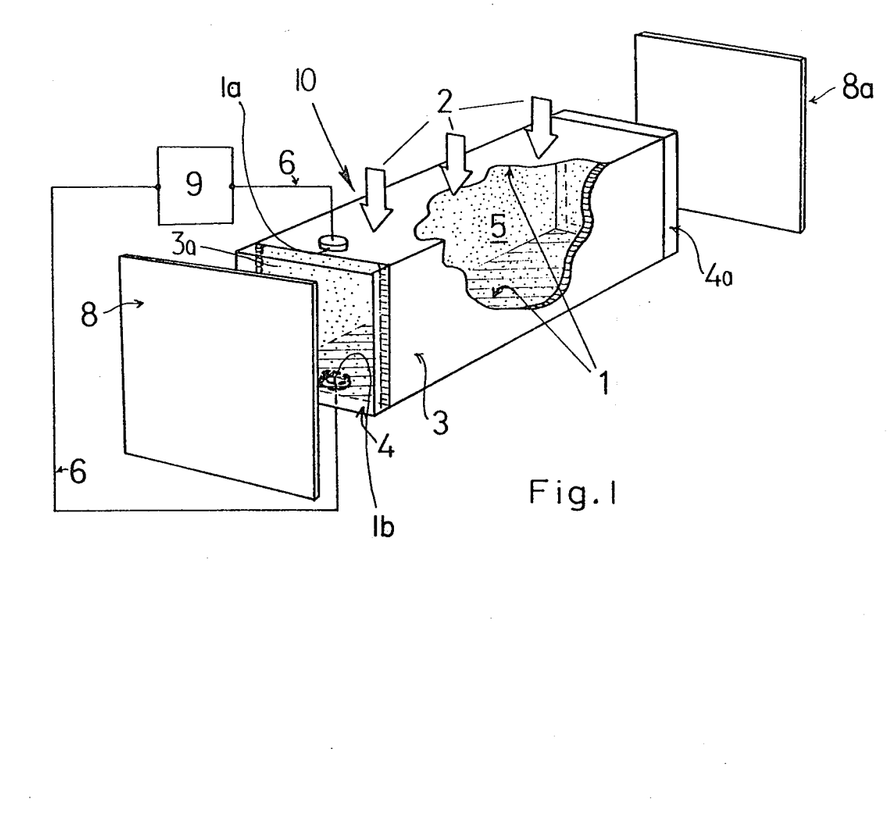
FIG. 1 is a partially cutaway perspective drawing of one embodiment of the invention.

The embodiment of FIG. 1 shows an arrangement for the creation of a coherent light beam with the novel cadmium-mercury dimer laser. A discharge vessel, generally indicated as 10, is composed of electrically insulating side walls 3 and 3a and end windows 4 and 4a, and top and bottom walls 1 which will permit passage of an electron beam. The end windows are transparent to the radiation which is to be amplified and are anti-reflection coated. Optionally they can be tilted (not shown) at the Brewster angle to minimize reflection loss as known in the art. The interior of the vessel, indicated generally at 5, forms a discharge volume, and is filled with a mixture of argon, mercury vapour and cadmium vapour.

Electrodes 1a and 1b are oriented on the inside of two facing sides of discharge vessel 10. The electrodes are connected by conductors 6 to a power source 9. A beam of energetic electrons 2 from an external electron beam source (not shown) can be passed through one electrode 1a as uniformly as possible over the surface of the electrode 1a, across volume 5 to of insulating material and can be set back away from the discharge region 5 if necessary, in order to prevent the occurrence of surface tracking between electrodes 1a and 1b.

In this particular example the mixture of argon, mercury, and cadmium in the vessel 10 is in the ratios 20:4:1. The total number density of atoms in the discharge volume is 1.25 × 10$^{19}$ per cubic centimeter. Heating/cooling coils (not shown) are wrapped around vessel 10 to maintain the temperature at about 800° K. The voltage across electrodes 1 is such that the E/N value is 8 × 10$^{-17}$ volts-cm$^2$. At an electron density of 10$^{15}$/cm$^3$ the discharge current density will be approximately 150 amperes/cm$^2$ in this case.

The radiation to be amplified (a weak beam of light of wave length 4,700 Angstroms) is introduced through the window 4, and an electron beam of 10$^5$ electron-volts is passed between electrode 1a and 1b, which are held at a potential difference of 10,000 volts. The separation between electrodes 1a and 1b is approximately 10 centimeters. Amplification of the radiation sought to be amplified is noted.

If desired, the same arrangement can be used as an optical oscillator, by placing mirrors 8 and 8a into position as shown outside the two windows. Mirror 8a is partially transparent to permit beam passage through it after a sufficient beam has been built up as is known in the laser art. The oscillator may be tuned by any suitable method such as a prism, filter, or diffraction grating, as is known by persons skilled in the art.

The arrangement of FIG. 1 is used when very short-term excitation is desired, such as excitation for about 1–10 microseconds at a time.

With this design and all other apparatus designs discussed subsequently, care should be taken to prevent surface tracking of electrons across the insulating side walls of the chamber. As is known in the art, this can be prevented by a variety of means well known in the art, such as having the insulated walls set back from the path of the discharge. Also, care must be taken to prevent a premature static breakdown within the discharge chamber, as known in the art, this can be prevented by commencing the electron beam before a voltage is applied across the electrodes.

EXAMPLE 2

Figure 2:
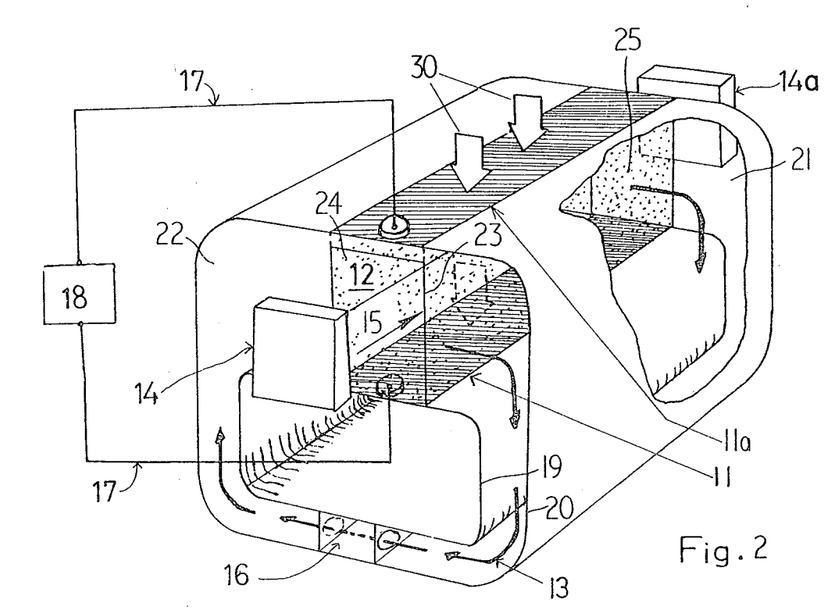
FIG. 2 is a partially cutaway perspective drawing of a second embodiment of the invention.

FIG. 2 shows another discharge arrangement suitable for use with the invention. In FIG. 2, the mixture of cadmium vapour, mercury vapour and noble gas is contained in an annular vessel having an inner annular wall 19 and an outer annular wall 20. The vessel is also provided with end walls to contain the mixture. One such end wall is shown at 21; the other is shown in partial cutaway at 22. The space between walls 19 and 20 defines loop-shaped flow path 13; around which the discharge mixture flows. The portion 12 of this loop (which is delineated by lines 23 for clarity) forms the discharge chamber. At another location along flow path 13 is a heat exchanger and pump indicated diagrammatically at 16, which serve to keep the mixture at the desired temperature, and to keep it moving through the discharge region 12.

The discharge region 12 is provided at its ends with windows 24 and 25, which are transparent to the radiation to be emitted. Electrodes 11 and 11a are oriented on opposite sides of the discharge region 12, and are connected by conductors 17 to a suitable power supply 18. An electron beam source is provided to create a beam of electrons (shown at 30) across the electrodes 11. The electrode separation is 10 centimeters.

When this discharge vessel is to be used as an amplifier, it is first filled with a suitable number density of mercury vapour-cadmium vapour-noble gas mixture, then a suitable voltage is applied across electrodes 11. For example, with a mixture composition of Cd:Hg:Ar in the ratio 1:40:20, a total number density of 1.25 × 10$^{19}$, a suitable voltage across the electrodes is 10,000 volts. This voltage is chosen such that E/N will be approximately 8 × 10$^{-17}$ volts-cm$^2$. The discharge current density will be of the order of 150 amperes/cm$^2$, for an electron density of 10$^{15}$/cm$^3$. The radiation to be amplified (a beam of light of 4,700 Angstroms) is then passed in through a window 24, in the direction shown by arrow 15 and an amplified beam exits through window 25.

It is is desired to use this arrangement as an oscillator, mirrors 14 and 14a are placed outside windows 24 and 25 to reflect back the radiation escaping from those windows. Mirror 14a is partially transparent, as is well known, to permit passage of a light beam through it when the intensity reaches a certain level. The oscillator can be tuned, as by means of a prism, filter or diffraction grating, as is well known.

While the inventors do not wish to be limited to any theory of operation, it is believed that the electrons introduced to the discharge chamber excite cadmium atoms, according to the process:

$$e^- + Cd(0) \rightarrow Cd(5^3P_{0,1,2}) + e^-.$$

The excited cadmium atoms then form excited CdHg dimer molecules by three body combination, according to the formulae $$Cd(5^3P_{0,1,2}) + Hg(0) + Hg(0) \rightarrow CdHg^* + Hg(0)$$

and $$Cd(5^3P_{0,1,2}) + Hg(0) + \text{Noble Gas Atom} \rightarrow CdHg^* + \text{Noble Gas Atom}$$

CdHg*, in the above formulae indicates any one of the following excited states of the cadmium-mercury molecule:

$$[Cd(5^3P_0) + Hg(0)]$$

$$[Cd(5^3P_1) + Hg(0)]$$

$$[Cd(5^3P_2) + Hg(0)]$$

Each of these states can yield $Hg(0) + Cd(0)$ plus a photon.

Competing reactions, which would give excited $Cd_2$ molecules, are unwanted, and are reduced to negligible proportions by the use of excess amounts of mercury, relative to the amount of cadmium present.

Figure 5:
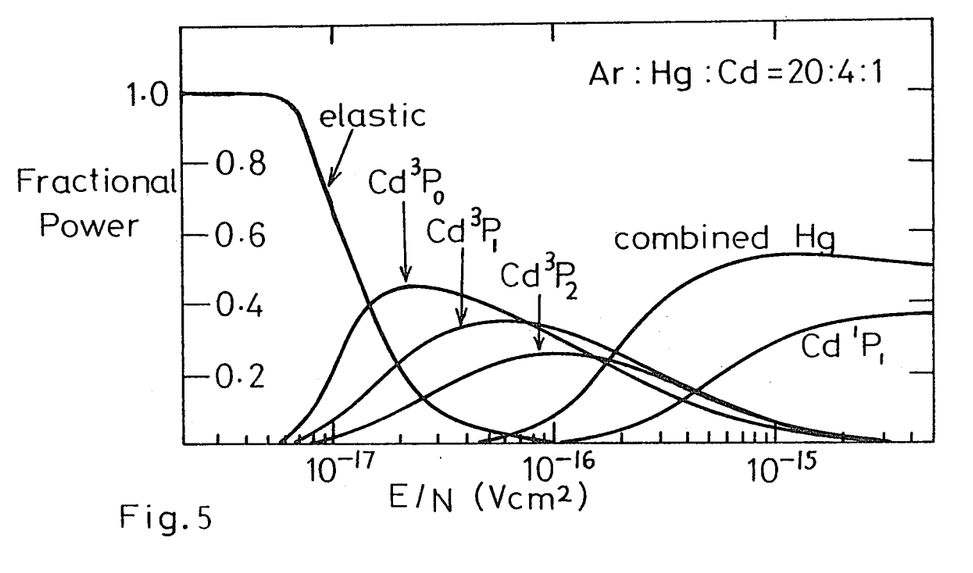
FIG. 5 is a diagram showing the calculated contribution of different excited species to the total output power.

The calculated fractional distribution of power in the discharge as a function of the ration of electric field to total gaseous number density (E/N), is shown in FIG. 5. With reference to that figure, calculations show that it is possible to excite the $Cd(5^3P_{0,1,2})$ levels with an overall efficiency of approximately 95% at an E/N value around $6 \times 10^{-17}$ volts-cm$^2$. There is a region of E/N between $2 \times 10^{-17}$ and $\times 10^{-16}$ volts-cm$^2$ in which highly efficient selective excitation of cadmium atomic levels is possible, while at the same time relatively little excitation of mercury atoms occurs. These excited mercury atoms quickly form excited mercury dimers which are known to absorb light in the spectral region of the mercury-cadmium emission. Their formation should therefore be avoided by keeping the E/N value low enough in the calculations. The electron excitation cross-sections between all the members of the set of seven Hg levels [Hg(0), Hg($6^3P_{0,1,2}$), Hg($6^1P_1$), Hg(complex), Hg +], where the Hg(complex) is a set of levels higher in energy than the Hg($6^1P_1$) level, the electron rates within the following set of cadmium levels [Cd(0), Cd($5^3P_{0,1,2}$), Cd($5^1P_1$) Cd(complex), Cd +] and the rates within the set of [noble gas (0), noble gas (resonance level), noble gas (ion)] were considered. The noble gas used was argon (Ar.).

The time dependent evolution of the atomic states in all the three sets of levels previously mentioned and various molecular states was computed. Many collision processes, such as the dissociative recombination of electrons and ions, three-body formation of ions and excited molecules, collisional relaxation of atomic states, elastic collisions between electrons and atoms and between atomic species were considered. These computations showed that with electron densities around $10^{14}$/cm$^3$ and E/N value of approximately $8 \times 10^{-17}$ volts-cm$^2$ is possible to achieve stored energy densities of around 10 Joules/litre after the discharge has operated for 1 microsecond. In order to maintain the electron number density at such a high value, electrons can be created constantly within the discharge volume by the passage through it of a beam of energetic charged particles, such as a beam of electrons at energies of the order of 100,000 volts or greater. The rate of creation of electron-ion pairs by this method should approximately balance the rate of recombination which proceeds principally through dissociative recombination. For the mixture concerned, it is possible to maintain the electron density at a value between $10^{14}$ to $10^{15}$/cm$^3$ by a beam of charged particles whose total power is very much lower than the power in a discharge. Thus the creation of electrons by this mean has little effect on the efficiency of the system. The total number density of neutral atoms may be between $1.5 \times 10^{17}$/cm$^3$ and $10^{21}$/cm$^3$. To obtain a stored energy of 10 Joules/liter, it should be around $10^{19}$/cm$^3$.

In another aspect, the invention relates to an optical amplifier or resonator using an ammonia-mercury complex as the agent giving light amplification.

According to this aspect of the invention, a discharge mixture of mercury vapour and ammonia is formed in which the ionization is sustained by means of an electron beam which injects electrons in the mixture at energies around or above $10^5$ electron volts. Preferably, an inert gas can also be present. The noble gases are preferred as the inert gas, and argon is especially preferred.

In order that the system be operative, the number density of atoms in the discharge volume can range from $1.2 \times 10^{18}$ to $5 \times 10^{20}$. Of these, from $2 \times 10^{17}$ to $5 \times 10^{18}$ should be atoms of mercury. Ammonia is present in a number density of from $10^{18}$ to $5 \times 10^{20}$. Preferably deuterated ammonia is used, as this enhances the efficiency of the discharge. A noble gas, the total number density of which should not exceed $2 \times 10^{19}$ can also be present. In this disclosure, "noble gas" means a gas selected from the group of Helium, Neon, Argon, Xenon or Krypton. Provided that the number densities of ammonia and mercury vapour are such that the total falls within the range of total number densities set out above, the noble gas can be eliminated. However, it is preferred to have some noble gas present, as it is believed to assist in the formation of an ammonia-mercury dimer by means of a three-body process, as well as aiding in the dissipation of excess heat from the discharge chamber, and reducing the ionization coefficient per neutral atoms. In addition to the constraints stated above, the ratio of the number density of ammonia to the square of the number density of mercury should be equal or greater than $2.5 \times 10^{-17}$/cm$^{-3}$ as this insures a preferential formation of the mercury-ammonia complex rather than the excited mercury dimer. The ratio of ammonia to mercury can range from 5:1 to 100:1 with a range of between 10:1 to 50:1 being preferred.

The discharge may be carried out at any temperature which is suitable for the maintenance of the required number density of atoms. In general, it is preferred that as low a temperatures as possible, consonant with the number density sought, be used. The ratio of electric field to total mixture number density (E/N) should be kept between $6 \times 10^{-16}$ volts-cm$^2$ to $10^{-15}$ volts-cm$^2$ and preferably between $3 \times 10^{-16}$ to $5 \times 10^{-16}$ volts-cm$^2$. As the ratio of ammonia to mercury is increased, the optimum value of E/N also increases. The mercury ammonia or the mercury-deuterated ammonia both emit in a band centered at around 3,500 Angstroms with a full width of approximately 500 Angstroms and a gain cross-section of the order of $10^{-19}/cm^2$.

EXAMPLE 3

Either of the discharge chambers of FIGS. 1 or 2 can be used for the excitation and discharge of the mercury-ammonia complex. In an example of the use of the arrangement of FIG. 1, the discharge chamber 5 is filled with a mixture of $2 \times 10^{17}$ atoms per cubic centimeter of mercury and $2 \times 10^{18}$ argon atoms per cubic centimeter and $10^{18}$ ammonia molecules per cm$^3$. Electron density within the discharge chamber is maintained at a number density of $10^{14}$ electrons to $10^{15}$ electron-volts. In this case, an E/N value of $5 \times 10^{-16}/cm^2$ is obtained by applying a voltage of $1.6 \times 10^4$ volts across an electrode separation of 10 cm. The discharge current density is around 150 amperes/cm$^2$. Amplification is obtained of a light beam of wave length around 3,500 Angstroms passed into the discharge chamber through a window 4.

Similarly, the arrangement of FIG. 2 can be used with the same number densities of atoms and molecules, and the same voltage and current as described above.

EXAMPLE 4

Figure 3:
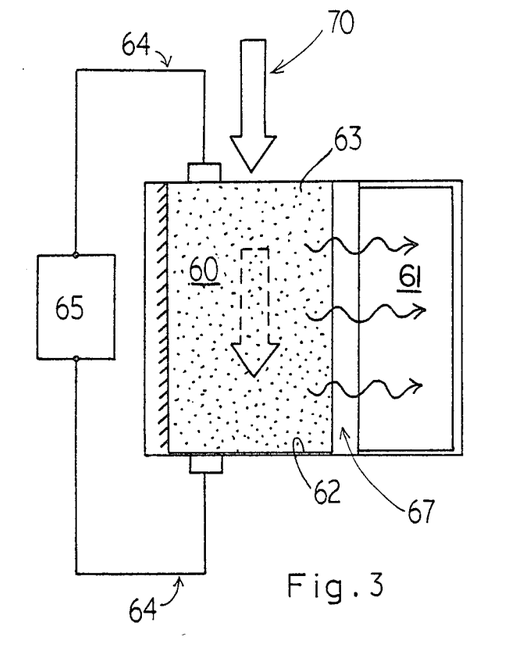
FIG. 3 is a transverse section of a third embodiment of the invention.
Figure 4:
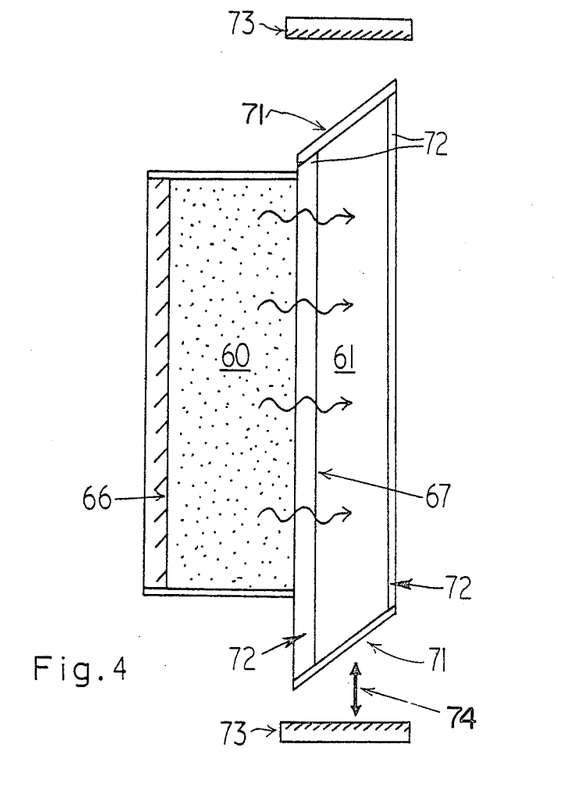
FIG. 4 is a top plan section of this third embodiment of the invention.

FIGS. 3 and 4 show a particularly desirable arrangement for use with the invention. This arrangement provides two chambers, generally indicated as 60 and 61. Electrodes 62 and 63 are connected by conductors 64 to a power source 65. One wall 66 is formed of a mirror which can reflect radiation of 2,537 Angstroms. The opposing wall 67 is transparent to radiation of 2,537 Angstroms. The chamber is of course bounded by two end walls (not shown) so as to make it gas tight. These end walls are opaque and thermally and electrically insulating. At opposing ends of chamber 61 are windows 71 which are transparent to the type of radiation to be amplified.

Chamber 61 is bounded with the exception of transparent wall 67 and windows 71, by thermally insulating walls shown generally as 72.

In operation, chamber 60 is filled with a mixture of mercury vapour with a noble gas as previously defined. The noble gas, besides serving to cool the mercury vapour, also broadens the emission spectrum of the mercury atomic transitions, thereby diminishing the phenomenon or "radiative trapping", which might otherwise slow the desired emission process. The number density of mercury atoms ranges from $5 \times 10^{16}$ to $10^{18}$. The number density of noble gas can be in a ratio relative to mercury of 10:1 to 500:1. The E/N ratio should be kept from $10^{-16}$ to $10^{-15}$. A voltage must be applied between electrodes 62 and 63 such that the E/N value is maintained in the range quoted above. An electron beam 70 is directed into the chamber in order to give an electron density between $10^{14}$ and $10^{15}$. As an example, with a number density of mercury atoms of $10^{17}$, and a number density of argon atoms of $10^{19}$, an E/N value of $4 \times 10^{-16}$ can conveniently be used at a temperature sufficient to obtain $10^{17}$ mercury atoms per cubic centimeter at the pressure used. This combination of parameters excites the mercury to emit light at 3,537 Angstroms. The light passes through transparent window 67 into chamber 61, which is filled with a mixture of mercury vapour, ammonia and noble gas. The number density of atoms present in chamber 61 should be between $1.2 \times 10^{18}$ and $5 \times 10^{20}$. The ratio of ammonia to mercury should be from 5:1 to 100:1 and preferably 10:1 to 50:1. The ratio of the number density of ammonia to the square of the number density of mercury is preferably equal or greater than $2.5 \times 10^{-17}/cm^{-3}$, as efficiency is low below this value. The noble gas (as hereinbefore defined) can be present in a number density less than $2 \times 10^{19}$ per cm$^3$. The amount of noble gas is taken into account when calculating the number density of atoms present. The mixture can be maintained at any convenient temperature, provided that the desired number density can be maintained at that temperature. It is desirable to maintain the temperature at as low a temperature as is consonant with the number density of atoms sought, in order to minimize losses due to photo-absorption, which tends to increase with temperatures. By way of example, a suitable mixture comprises mercury vapour in a number density of $2 \times 10^{17}$, deuterated ammonia in a number density of $10^{18}$ and argon in a number density of $10^{19}$. The mixture is maintained at the required temperature by means of heating/cooling coils embedded in walls 72. When a light beam of wave length around 3,500 Angstroms is passed into the chamber through window 71, and the voltage as discussed previously is applied across electrodes 62 and 63, the light beam is amplified.

If desired, mirrors 73 could be placed outside windows 71, to reflect the light beam back on itself through the windows. This causes the device to function as an oscillator, the direction of propagation of the light beam being indicated by arrows 74. The oscillator may be tuned by known means, such as, for example, a prism, filter or diffraction grating.

It is understood that the foregoing describes particular embodiments of the invention, and that many modifications thereof will be obvious to one skilled in the art. For example, many other geometries of discharge vessel can be used if desired, and the discharge according to the invention can be used for many different functions, as will be obvious to skilled persons. It is therefore understood that the specific examples of the disclosure are not intended to limit the scope of invention, which is as defined in the appended claims.

What is claimed is:

1. A method of obtaining optical amplification comprising:
   (a) providing in a discharge chamber a mixture comprising at least $5 \times 10^{16}$ atoms of cadmium vapour per cubic centimeter and atoms of mercury vapour in a ratio of mercury atoms to cadmium atoms of from 2:1 to 100:1, the total number density in the mixture not exceeding $10^{21}$ atoms per cubic centimeter and
   (b) exciting said mixture by creation of an electron density of $10^{14}$ and $10^{15}$ electrons per cubic centimeter in said discharge chamber whereby to cause an optical amplification.

2. A method as claimed in claim 1, in which the said cadmium vapour and mercury vapour are the only components of said mixture, except for unavoidable impurities.

3. A method as claimed in claim 1, in which, in addition to said mercury vapour and cadmium vapour, the mixture contains a noble gas selected from the group consisting of helium, neon, argon, krypton and xenon.

4. A method as claimed in claim 3, in which the noble gas is present in a number density of less than 1,000 times the number density of the cadmium.

5. A method as claimed in claim 4, in which the noble gas is argon.

6. A method as claimed in claim 4 in which the excitation is carried out at an E/N value of between $10^{-17}$ and $2 \times 10^{-16}$ volts-cm$^2$.

7. A method as claimed in claim 4, in which the excitation is carried out at an E/N value of between $2 \times 10^{-17}$ and $10^{-16}$ volts-cm$^2$.

8. A method as claimed in claim 3, in which the noble gas is present in a number density from 10 to 100 times the number density of cadmium atoms.

9. A method as claimed in claim 8, in which the noble gas is argon.

10. A method as claimed in claim 9, in which the excitation is carried out at an E/N value of between $10^{-17}$ and $2 \times 10^{-16}$ volts-cm$^2$.

11. A method as claimed in claim 9, in which the excitation is carried out at an E/N value of between $2 \times 10^{-17}$ and $10^{-16}$ volts-cm$^2$.

12. A method as claimed in claim 1 in which the ratio of mercury atoms to cadmium atoms is from 3:1 to 30:1.

13. A method as claimed in claim 12, in which said mixture is excited by directing a beam of electrons at a voltage in excess of 100,000 electron-volts and a current of 0.1 amperes to 10.0 amperes into said mixture.

14. A method as claimed in claim 13, in which the excitation is carried out at an E/N value of between $10^{-17}$ and $2 \times 10^{-16}$ volts-cm$^2$, the temperature of the mixture is maintained as nearly as possible to the minimum required in order to obtain number densities used.

15. A method as claimed in claim 13, in which the excitation is carried out at an E/N value of between $2 \times 10^{-17}$ and $10^{-16}$ volts-cm$^2$.

16. A method of obtaining an optical discharge which comprises;
  (a) providing in a discharge chamber a mixture comprising mercury vapour in an amount of from $2 \times 10^{17}$ to $5 \times 10^{18}$ atoms of mercury vapour per cubic centimeter and ammonia molecules in a ratio of from 1:5 to 1:100 per atom of mercury, and
  (b) exciting said mixture by
    creating an electron density of $10^{14}$ to $10^{15}$ electrons per cubic centimeter in said discharge chamber whereby to cause an optical amplification.

17. A method as claimed in claim 16, in which the mercury vapour and ammonia are the only components of said mixture, except for impurities.

18. A method as claimed in claim 16, in which in addition to said mercury vapour and said ammonia, the mixture contains a noble gas selected from the group consisting of Helium, Neon, Argon, Krypton and Xenon.

19. A method as claimed in claim 18, in which the noble gas is present in a number density of less than $2 \times 10^{19}/\text{cm}^3$.

20. A method as claimed in claim 19, in which the noble gas is argon.

21. A method as claimed in claim 18, in which the mixture is excited by the creation of an electron density of from $10^{14}$ to $10^{15}$ electrons per cubic centimeter in said discharge chamber, the said excitation being carried out at an E/N value of between $2 \times 10^{-16}$ and $6 \times 10^{-16}$ volts-cm$^2$.

22. A method as claimed in claim 18, in which the mixture is excited by the creation of an electron density of from $10^{14}$ to $10^{15}$ electrons per cubic centimeter in said discharge chamber, the said excitation being carried out at an E/N value of between $3 \times 10^{-16}$ and $5 \times 10^{-16}$ volts-cm$^2$.

23. A method of obtaining an optical discharge which comprises:
  (a) providing in a discharge chamber a mixture comprising mercury vapour in an amount of from $2 \times 10^{17}$ to $5 \times 10^{18}$ atoms of mercury vapour per cubic centimeter and ammonia molecules in a ratio of from 1:5 to 1:100 per atom of mercury, and
  (b) exciting said mixture by supplying radiation of approximately 2,537 Angstrom wave length to said chamber in a sufficient amount to excite said mixture, whereby to cause an optical amplification.

24. A method as claimed in claim 23, in which said radiation is generated by passing an electron beam through a mixture of mercury vapour and a noble gas selected from the group consisting of helium, neon, argon, krypton and xenon, said radiation being generated in a chamber adjacent said discharge chamber, which chamber is separated from said discharge chamber by a window substantially transparent to radiation of a wave length of 2,537 Angstroms.

25. A method as claimed in claim 24, in which the mixture is excited by the creation of an electron density of from $10^{14}$ to $10^{15}$ electrons per cubic centimeter in said discharge chamber, the said excitation being carried out at an E/N value of between $2 \times 10^{-16}$ and $6 \times 10^{-16}$ volts-cm$^2$.

26. A method as claimed in claim 24, in which the mixture is excited by the creation of an electron density of from $10^{14}$ to $10^{15}$ electrons per cubic centimeter in said discharge chamber, the said excitation being carried out at an E/N value of between $3 \times 10^{-16}$ and $5 \times 10^{-16}$ volts-cm$^2$.

27. A method as claimed in claim 23, in which the mercury vapour and ammonia are the only components of said mixture, except for impurities.

28. A method as claimed in claim 23, in which in addition to said mercury vapour and said ammonia, the mixture contains a noble gas selected from the group consisting of Helium, Neon, Argon, Krypton and Xenon.

29. A method as claimed in claim 28, in which the noble gas is present in a number density of less than $2 \times 10^{19}/\text{cm}^3$.

30. A method as claimed in claim 29, in which the noble gas is argon.

* * * * *